United States Patent [19]

Albrecht et al.

[11] Patent Number: 4,783,348
[45] Date of Patent: Nov. 8, 1988

[54] METHOD AND APPARATUS FOR DEPOSITING MONOMOLECULAR LAYERS ON A SUBSTRATE

[75] Inventors: Otto Albrecht, Torrance; Meir Bartur, Los Angeles; Vladimir Rodov, Redondo Beach, all of Calif.

[73] Assignee: Daleco Research Development, Newport Beach, Calif.

[21] Appl. No.: 934,426

[22] Filed: Nov. 24, 1986

Related U.S. Application Data

[63] Continuation-in-part of Ser. No. 06/815,512, Jan. 2, 1986, Pat. No. 4,722,856.

[51] Int. Cl.$^4$ .......................... B05D 1/18; B05D 1/36; B05D 7/00
[52] U.S. Cl. ..................................... 427/402; 118/402; 118/429; 264/298; 427/434.3; 427/434.5
[58] Field of Search ................ 118/402, 429; 264/298; 427/402, 434.3, 434.5

[56] References Cited

U.S. PATENT DOCUMENTS

| | | | |
|---|---|---|---|
| 4,224,896 | 9/1980 | Barraud et al. | 118/402 |
| 4,361,605 | 11/1982 | Takahashi et al. | 427/434.5 |
| 4,400,416 | 8/1983 | Takahashi et al. | 427/434.5 |
| 4,511,604 | 4/1985 | Barraud et al. | 118/402 X |
| 4,632,800 | 12/1986 | Barraud et al. | 427/412.3 X |

OTHER PUBLICATIONS

1. "Langmiur Trough for Fabrication of Langmuir–Blodgett Films" 4 page publication, dated Dec. 9, 1983.

*Primary Examiner*—Michael R. Lusignan
*Attorney, Agent, or Firm*—Spensley Horn Jubas & Lubitz;

[57] ABSTRACT

Disclosed is a method and apparatus for continuously forming and depositing a layer of monomolecular amphiphilic molecules on a substrate. The present invention includes an apparatus and method for transferring and compressing an uncompressed molecular layer from one liquid surface region in a tank to another adjacent liquid surface region by using non-moving or static mechanical components which do not come into direct contact with the monomolecular layer. The present invention includes a method and apparatus which permit the continuous and simultaneous draining and replenishing of the liquid in the tank while maintaining the liquid surface level constant. The continuous replacement of the liquid in the tank with clean liquid reduces the level of contamination of the liquid in the tank. In addition, the level, as well as the type of contamination of the liquid, does not vary significantly with time. This aspect of the present invention reduces the variation in the quality and characteristics of the monolayers that are produced in the tank and are deposited onto the substrate. Also by reducing the need to replace the liquid in the tank periodically, the present invention increases the efficiency of the process.

6 Claims, 3 Drawing Sheets

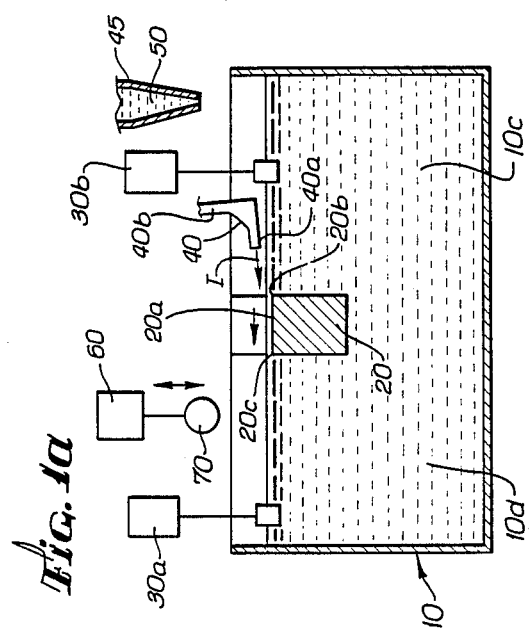

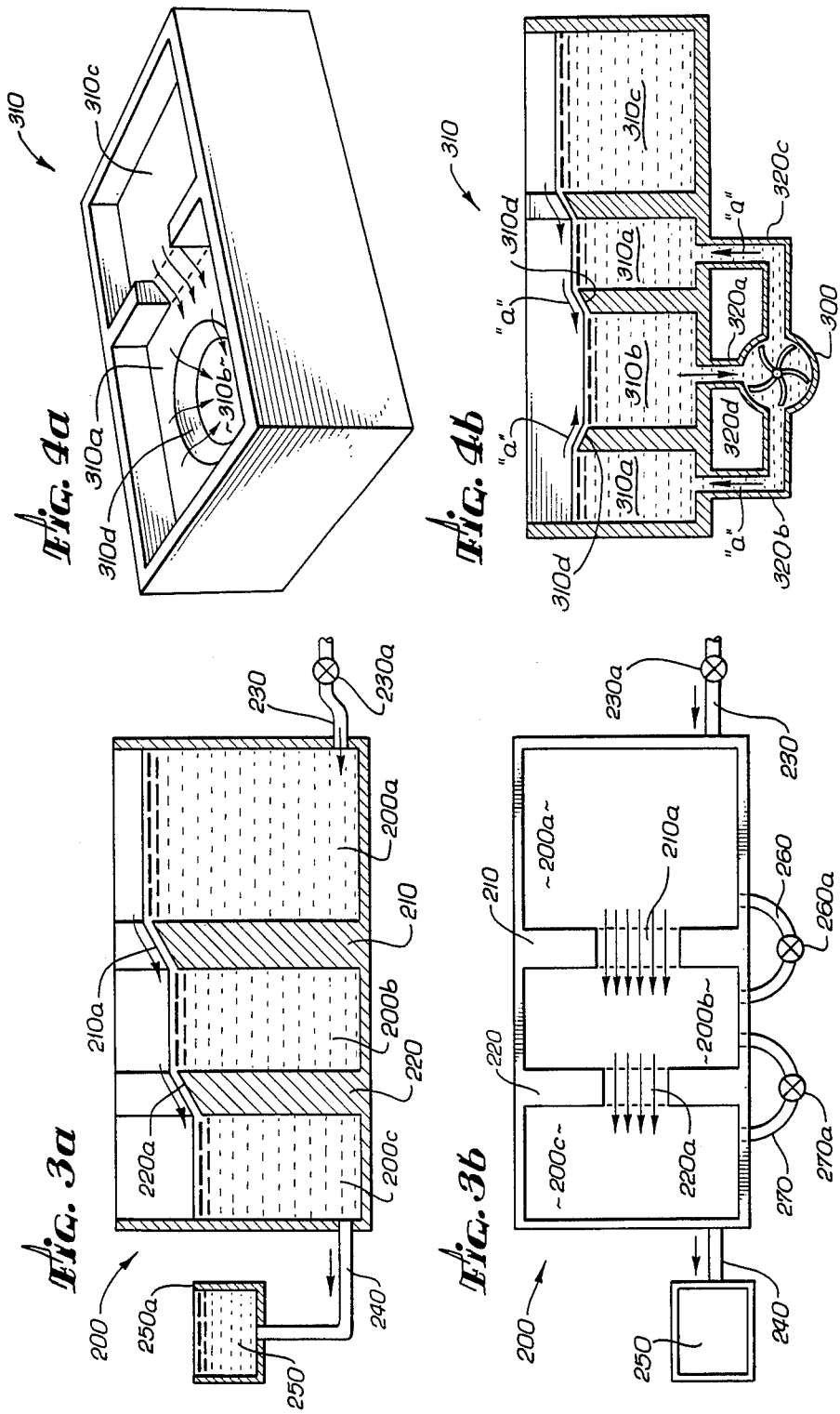

METHOD AND APPARATUS FOR DEPOSITING MONOMOLECULAR LAYERS ON A SUBSTRATE

BACKGROUND OF THE INVENTION

1. Related Application

This is a continuation-in-part of U.S. Ser. No. 06/815,512, filed on Jan. 2, 1986, now U.S. Pat. No. 4,723,856, patented Feb. 2, 1988.

2. Field of the Invention

This invention relates to a method and apparatus for producing and depositing monomolecular layers on a substrate. More specifically, this invention is concerned with a practical method for continuously producing and depositing monomolecular layers onto substrates.

3. Prior Art

Monomolecular layers of organic compounds find a large number of applications, especially in the field of electronics. For example, monomolecular layers are used in forming metal-insulator-metal structures in which the thickness of the dielectric insulator layer must be controlled with a particularly high degree of accuracy.

One known method for producing and depositing monomolecular layers of amphiphilic molecules has been described by Langmuir (J. Am. Chem. Soc., Vol. 57 (1935) pp 1007–1010). Amphiphilic molecules are those having a hydrophilic end and a hydrophobic end, and line up side-by-side in a particular direction.

The Langmuir method consists of forming a monomolecular layer at the surface of a tank filled with a liquid such as water. In accordance with this method, a solution of amphiphilic molecules dissolved in a solvent is spread onto the liquid surface, whereupon the solvent evaporates so that a loosely packed monomolecular layer is formed on the liquid surface. A transition of the monomolecular layer thus formed from a state of gas or liquid to a solid state is then achieved by reduction of the surface area of the layer by compressing it to a predetermined surface pressure. The resulting monomolecular layer is deposited onto the surface of a substrate by passing the substrate through the compressed layer while maintaining the layer at the predetermined surface pressure during the period of deposition.

The standard method adopted for compressing the monomolecular layer consists of using a leak-tight moving barrier which moves over the liquid surface of the tank. By displacing the barrier, the area of the monomolecular layer which had previously been formed at the liquid surface of the tank is reduced to bring the layer to the desired surface pressure. When this value is attained, the deposition operation can begin. The surface pressure of the layer is maintained at this desired surface pressure value by displacing the moving barrier so as to provide progressive compensation for the space left by the molecules which have been deposited on the substrate. On completion of the deposition operation, the moving barrier is brought back to its original position, the surface of the liquid is cleaned of the residual material and then the entire surface of the liquid is again available for the introduction of a fresh quantity of amphiphilic molecule solution.

This standard method does not readily permit continuous formation and deposition of monomolecular layers onto substrates since it is necessary to periodically replenish the bath and to compress the layer. In addition, the continuity of the compressed layer is not readily reproducible. Further, the moving barrier cause stress in some areas of the monomolecular layer, often damaging the layer.

The standard Langmuir tank that is used for forming monomolecular layers is closed from all sides except for its open top, and thus does not permit the continuous and simultaneous draining and replenishing of the liquid in the tank. It is known that the liquid in the tank is being contaminated over time from external sources such as gases from the air, organics from the spreading solvent and dissolved species from the substrate or from working parts in the tank and due to the leaching of organic and inorganic contaminants from the tank itself. Moreover, since the nature of contamination can vary and since this type of contamination is a cumulative process, the level of contamination of the liquid in the tank and the type of contamination vary with time. The contamination that varies with time can manifest itself as a lower quality, as well as a variation, in the quality and characteristics of the monolayers that are produced in the tank and of the monolayers or the multilayers that are deposited onto substrates. This problem is usually mitigated by dumping and refilling the tank periodically (O. Albrecht, Thin Solid Films, Vol. 99 (1983) pp. 227–234). However, these activities are time consuming and significantly reduce the efficiency of the process.

One method for continuously producing and depositing monomolecular layers of amphiphilic molecules on solid substrates is described in U.S. Pat. Nos. 4,093,757 and 4,224,896. Specifically, the liquid surface contained in a water tank is divided into two adjacent compartments that are separated by a horizontal rotatable cylinder which is partly immersed in the liquid of the tank. A compressed monomolecular layer is formed in one of the compartments by transferring an uncompressed layer from one compartment to the adjacent compartment by imparting rotational motion to the cylinder. The rotating cylinder applies pressure to the uncompressed layer to thereby compress it to a predetermined surface pressure. The continuous production and deposition of monomolecular layer on substrates is performed by continuously introducing a solution of amphiphilic molecules into one compartment, continuously transferring the molecules from that compartment to an adjacent compartment by imparting rotational motion to the cylinder, and continuously dipping a substrate into the adjacent compartment.

Although the method described above may work conceptually, it has several disadvantages which render the method impractical for commercial applications. Specifically, the construction and material of the tank and of the cylinder that separates adjacent tank compartments, are disclosed to be highly dependent upon the desired application. In addition, frequent cleaning is required because the cylinder is coated with amphiphilic molecules. Still further, the process uses moving items (e.g., the cylinder) in contact with the monomolecular layer which cause a breakdown of the monomolecular layer as these items tend to cause stress in the liquid surface thereby ruining the continuity of the layer. The system also has sealing problems, specifically around the ends of the cylinder, thus making it difficult to achieve and maintain a predetermined monomolecular layer surface pressure.

SUMMARY OF THE INVENTION

Basic to the present invention is the fact that a film at a water surface can be compressed to a higher surface pressure and simultaneously transported by a flow at that surface, and that this flow, preferably laminar, can be generated without any moving mechanical parts in contact with the film (i.e., non-moving mechanical components such as a rotating cylinder or a floating barrier). Moving parts at the film covered surface tend to cause damage and stress to the formed layer. The present invention is based on the fact that by using a liquid surface with at least two surface regions in flow communication with each other, and preferably adjacent, where the top surface layer of the liquid contained in these regions is continuously flowing from one region to another region by using non-moving or static mechanical components that do not contact the monomolecular layer, a monomolecular layer having surprisingly little damage can be formed in the other region and compressed by the moving liquid surface wherein the monomolecular layer can then be deposited onto a substrate. This process makes it possible to apply a predetermined surface pressure to the monomolecular layer, the value of this pressure being primarily dependent on the surface flow between each two regions. Moreover, due to the present invention, it is now commercially feasible to continuously supply a first region with a solution of amphiphilic molecules, and then to deposit continuously onto a substrate or onto several substrates within an adjacent region the monomolecular layer which has been compressed and transported into this latter region.

The present invention is specifically concerned with an apparatus and method for the practical application of monomolecular layers to a substrate which uses static mechanical means to transport and compress the molecular layers.

In one embodiment of the apparatus of the present invention, a static mechanical device such as a nozzle is used to stream gas across the surface of the liquid in the first region in the direction of the adjacent region. The stream of gas generates a flow of the top surface layer of the liquid from the first region to the adjacent region thereby compressing a monomolecular layer which had previously been spread onto the first region and transporting that compressed layer to the adjacent region. The nozzle does not come into contact with the monomolecular layer. The surface pressure of the monomolecular layer is regulated by regulating the gas stream rate.

In another embodiment of the apparatus of the present invention, a static mechanical device such as liquid conduits, for example, are attached to a tank having two adjacent regions with one conduit directing liquid into a first region at a selected flow rate and another conduit connected to the adjacent region and directing flowing liquid out of the adjacent region. Preferably, the liquid in the region in which the solution of the amphiphilic molecules is spread has a higher liquid level than the liquid level in the adjacent region within which the monomolecular layer is deposited onto a substrate. The flow of the liquid from one region to the adjacent region is thus caused by the difference between the levels of the liquid in the two regions and the fact that a continuous liquid flow is maintained. The surface pressure is regulated by selectively regulating the rate of liquid flow between adjacent regions.

In yet another embodiment of the apparatus and method of the present invention a static mechanical device comprises conduits which connect a circulation pump to the tank, the pump circulating the liquid in the tank thereby causing flow of the liquid surface.

The method for producing and depositing a monomolecular layer of amphiphilic molecules on a substrate in accordance with the present invention comprises the following steps:

(1) forming a noncompressed or loosely packed molecular layer by placing the molecules onto the surface of a liquid;

(2) applying a predetermined surface pressure to the layer thus formed, using static mechanical means and without the static mechanical means directly contacting the monomolecular layer, to thereby compress the layer and simultaneously transport the compressed layer to another surface of the liquid; and (3) depositing the transported, compressed layer onto the substrate.

In a continuous mode of the invention, the following steps take place in seriatim:

(1) moving the top liquid surface in one tank region towards the liquid surface in an adjacent tank region;

(2) continuously spreading a solution of molecules onto the liquid surface in one of the two adjacent tank regions to thereby form an uncompressed or loosely packed monomolecular layer;

(3) transporting and simultaneously compressing to a selected surface pressure the monomolecular layer by flowing the liquid surface from one region to the adjacent region, the means for transporting and compressing consisting essentially of static mechanical devices for directing sufficient force on the liquid surface in one region so that the liquid at the surface will flow to the adjacent region, the transporting and compressing means being free of mechanical contact with the monomolecular layer; and (4) continuously depositing the transported and compressed monomolecular layer onto a substrate or onto several substrates by passing the substrate through the compressed layer in the last region of the tank.

This sequence of operations permits the continuous and rapid formation and deposition of monomolecular layers of amphiphilic molecules. In addition, the construction of the apparatus of the present invention is not dependent upon the desired application of the present invention since the surface pressure of the monomolecular layer in the last region can be controlled by controlling the velocity of the top surface layer of the liquid moving between adjacent regions. Further, the continuous movement of liquid transport media reduces the need for cleaning, and there are no moving items which might cause a breakdown of the monomolecular layer. These advantages render this invention practical for commercial applications.

Another aspect of the present invention is concerned with reducing the level of contamination as well as the variability of contamination of the liquid on the surface of which monolayers are produced, thus improving the quality and characteristics of the monolayers. According to this aspect of the present invention, the tank that is used for producing monolayers and for depositing monolayers onto substrates is continuously and simultaneously being drained and replenished with clean liquid while the level of the liquid surface is maintained constant. The liquid of the tank is thus being replaced continuously wihh clean liquid while monolayers are formed at the surface of the liquid and are deposited onto substrates.

In one embodiment of the tank of the present invention, the tank has an outlet and an inlet that permit a continuous and simultaneous replenishing and draining of the liquid in the tank while maintaining the level of the liquid surface constant. Since the liquid in the tank is continuously being replaced with clean liquid, the cumulative process of contaminating the liquid in the tank is thus reduced substantially and the content of the liquid does not vary significantly with time. It is thus possible to produce monolayers of higher quality and more consistency and to deposit the higher quality and more consistent monolayers onto substrates. It is also possible to improve the efficiency of the process.

BRIEF DESCRIPTION OF THE DRAWINGS

A more complete understanding of the invention will be obtained from the following description which is given by the way of example without any limitations being implied, reference being made to the accompanying drawings where:

FIGS. 1a,b are a diagrammatic cross-sectional view and top view, respectively, of one embodiment of the present invention wherein movement of the top surface layer of the liquid from one compartment to the adjacent compartment is generated by a stream of gas that is blown tangentially to the surface of the liquid in one compartment in the direction of the adjacent compartment.

FIGS. 2a,b are a diagrammatic cross-sectional view and top view, respectively, of another embodiment of the present invention wherein movement of the surface of the liquid from one compartment to the adjacent compartment is caused by the different levels of the liquid in said two compartments and the fact that a continuous liquid flow is maintained.

FIGS. 3a,b are a diagrammatic cross-sectional view and top view, respectively, of another embodiment of the present invention particularly adapted to commercial continuous operation.

FIGS. 4a,b are a diagrammatic perspective top view and vertical cross-sectional view, respectively, of another embodiment of the present invention wherein a pump is used to generate and control the transport media flow.

DETAILED DESCRIPTION OF THE INVENTION

Figure 5:
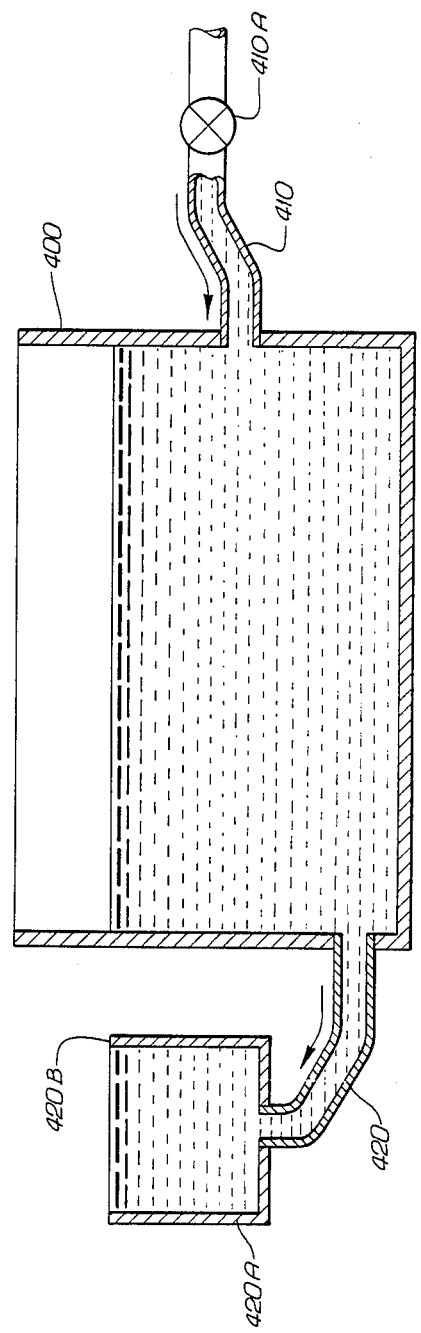
FIG. 5 is a diagrammatic cross-sectional view of one embodiment of the tank of the present invention.

The following description is of the best presently contemplated mode of carrying out the invention. This description is made for the purpose of illustrating the general principles of the invention and is not to be taken in a limiting sense. The scope of the invention is best determined by reference to the appended claims.

FIGS. 1a,b show tank 10 filled with a liquid. Although water is the preferred liquid, any monomolecular layer transport media is within the scope of this invention. The particular liquid transport media chosen will depend upon a variety of factors including the chemical interaction of the media with the molecules forming the monomolecular layer. Means for controlling the temperature and pH of the media is also contemplated.

Horizontal barrier wall 20 having an aperture, trough or cut-out 20a extends across tank 10 between tank walls 10a,b. Barrier wall 20 divides tank 10 into two adjacent compartments 110c,d. It should be appreciated that although this embodiment (and other described below) show tank compartments separated by a barrier wall, the present invention encompasses adjacent regions on a liquid surface. Thus, any tank compartment may have more than one liquid surface region.

In the embodiment now described, the level of the liquid surface in the tank is slightly above the edges 20b,c of the aperture 20a such that the media can flow across the bottom of the aperture. It should be appreciated that the aperture 20a is preferably centrally located on a portion of the top 20d of the barrier wall; however, it can also extend across the entire barrier wall.

Each compartment is also provided with a surface pressure detector 30a,b. These detectors are of a type known to those skilled in the art and are used to measure the surface pressure of the monomolecular layer formed.

Basic to the embodiment of the present invention shown in FIGS. 1a,b is nozzle means 40 for directing a gas at the liquid surface of compartment 10c whereby the liquid surface from compartment 10c is moved to compartment 10d without using rollers or other devices having dynamic moving components and, in addition, without contacting the monomolecular layer. Nozzle means 40 having gas outlet 40a and gas inlet 40b is connected to a source of a gas stream (not shown), and is placed above the tank 10 in proximity to barrier wall 20 so as to ensure that the nozzle will direct a stream of gas tangentially to the water surface in direction "I" across the entire length of aperture 20a. It is this gas stream that moves the liquid surface from compartment 10c to compartment 10d thereby compressing and transporting a monomolecular layer deposited on the liquid surface of compartment 10c as discussed in further detail below. It should be appreciated that air is a preferred gas source; however, other gases such as nitrogen and argon are within the scope of the invention depending upon the nature of the molecules forming the monomolecular layer. It is contemplated that the gas stream may be utilized, in addition to causing flow, to react with the monomolecular layer, for example, oxidation using an oxygen source. It is also contemplated that other transport media including liquids or aerosols could be substituted for the gas. It is yet further contemplated that reactive gases or liquids can be caused to contact the monomolecular layer to modify the layer at any compartment or region, and that such additional reactants can compliment or be in addition to the flow gas.

The molecules forming the monomolecular layer initially can be stored in reservoir 45 containing a solution 50 of amphiphilic or other suitable molecules. Reservoir 45 is placed above tank 10 so that the solution can flow downwards onto the liquid surface in compartment 10c to thereby form an uncompressed (or partially compressed) monomolecular layer. It should be understood that other methods of forming the uncompressed or loosely packed monomolecular layer are within the scope of the present invention such as bringing the solution 50 to the surface of tank 10c from below the liquid surface level.

Provision is made for a suitable dipping assembly 60 above compartment 10d whereby a substrate 70 to be coated can be dipped in the liquid of compartment 10d having a compressed monomolecular layer. The dipping assembly may be of the type disclosed in U.S. Pat. No. 4,093,757 or any other suitable assembly.

The continuous production and deposition of monomolecular layers onto substrates using the embodiment discussed above and in accordance with the method of the present invention will now be described.

Nozzle means 40 continuously directs a stream of gas tangentially to the water surface across the entire apperture 20a in direction I. While tangential direction is preferred, other directions are also within the scope of the invention. The gas stream generates a continuous laminar flow of the top surface layer of the liquid from compartment 10c to compartment 10d. The level of the liquid in the tank, however, remains constant due to the free flow of water between the two compartments.

Reservoir 45 dispenses a solution 50 of amphiphilic molecules at a controlled rate onto the liquid surface in compartment 10c, whereby the solvent evaporates and whereby an uncompressed monomolecular layer is continuously being formed. The amphiphilic molecules that form the monomolecular layer adhere to the liquid surface. As a result of the continuous movement of the top surface layer of the liquid from compartment 10c into compartment 10d, monomolecular layer is continuously transported from compartment 10c to compartment 10d. The uncompressed monomolecular layer is compressed during transport by the moving liquid surface into a compressed monomolecular layer. The surface pressure is controlled to a predetermined surface pressure by regulating the gas flow rate through the nozzle means 40.

As the monomolecular layer is being transported and thereby compressed, substrate 70 is repeatedly dipped into the liquid of compartment 10d whereby each time the substrate 70 passes through the compressed monomolecular layer, the substrate is coated with a monomolecular layer. As the monomolecular layer is deposited onto the substrate, the continuous movement of the top surface layer of the liquid from compartment 10c to compartment 10d ensures that the latter is being continuously replenished with monomolecular layer from compartment 10c and that the surface pressure of the monomolecular layer in compartment 10d is maintained constant.

The surface pressure of the monomolecular layer can be measured using surface pressure detectors 30a,b. During operation of the system, the surface pressure indicated by detector 30a is higher than the surface pressure indicated by detector 30b. Also, the surface pressure of the monomolecular layer in compartment 10d is dependent upon the velocity of the gas stream that is blown tangentially to the liquid surface. Thus it is an advantageous feature of the apparatus of the present invention that the surface pressure of the monomolecular layer in compartment 10d is readily controllable, hence the construction of the apparatus is not application-dependent.

It should be understood that while it is preferred that the region for molecule introduction, 10c, and the region for substrate coating, 10d be adjacent, it is only essential that such regions be in flow communication with each other. Thus, one or more regions could be in between regions 10c and 10d, with or without other operations being carried out in such in between regions.

In another embodiment of the apparatus of the present invention, the movement of the top surface layer of the liquid from one compartment to an adjacent compartment is caused by continuously flowing the transport media between two adjacent compartments which have different relative surface levels of the liquid transport media. With reference to FIGS. 2a,b, tank 110 is divided into adjacent compartments 110a,b by barrier wall 120. Each compartment 110a,b is provided with a surface pressure detector 190a,b, respectively. The top 122 of barrier wall 120 includes apperture, trough or cut-out 120a having downward sloping bottom 120b and edges 120c,d. The aperture 120a may extend across a portion or the entire top of the barrier wall 120. The level of the liquid surface adjacent the aperture 120a in compartment 110a is higher than the level of the liquid surface adjacent the apperture 120a in compartment 110b thereby facilitating transport media flow.

A source of liquid (not shown) is connected to compartment 110a through a conduit 130, the flow rate of the liquid through conduit 130 being controlled by valve 130a. A drainage conduit 140 connects compartment 110b to an open reservoir 140a that is filled with liquid to its capacity. The rim 140b of the reservoir 140a, and the water level in compartment 110b, are horizontally level.

Reservoir 150 containing solution 160 of amphiphilic molecules is placed above tank 110 so that the solution can flow downwards onto the surface of the water in compartment 110a. In that portion of the tank which corresponds to compartment 110b, provision is made for a suitable dipping assembly 170 whereby a substrate 180 to be coated can be dipped in the liquid of compartment 110b having compressed monomolecular layer.

The continuous deposition using the device in accordance with this second embodiment of the present invention will now be described.

An inflow of liquid is continuously introduced into compartment 110a through conduit 130. This flow assures that the level of the water surface in compartment 110a is always slightly above edge 120c of apperture 120a so that a thin layer of water always covers the downward sloped bottom 120b. As a result, there is a continuous laminar flow of the top surface layer of the liquid from compartment 110a to compartment 110b. In the latter compartment, the level of the water surface remains constant by the virtue of the open reservoir 140a.

Reservoir 150 dispenses solution 160 of amphiphilic molecules at a controlled rate onto the surface of the liquid in compartment 110a, whereby the solvent evaporates (as noted previously), and an uncompressed monomolecular layer is continuously being formed. The amphiphilic molecules that form the monomolecular layer adhere to the liquid. Therefore, as a result of the continuous movement of the top surface layer of the liquid from compartment 110a into compartment 110b, the uncompressed monomolecular layer is continuously transported from compartment 110a to compartment 110b. The uncompressed layer is compressed by the moving liquid surface into the compressed monomolecular layer having a predetermined surface pressure. At the same time, substrate 180 is dipped in the liquid of compartment 110b whereby each time the substrate 180 passes through the compressed monomolecular layer, it is coated with a monomolecular layer. As the monomolecular layer is deposited onto the substrate, the continuous movement of the top surface layer of the liquid from compartment 110a to compartment 110b ensures that the latter is being continuously replenished with compressed monomolecular layer from compartment 110a and that the surface pressure of the monomolecular layer in compartment 110b is maintained constant.

As previously discussed with respect to the first embodiment of the apparatus of the present invention, the surface pressure of the monomolecular layer coated on the substrate can be measured using the surface pressure detectors 190a,b. It is observed that the surface pressure indicated by detector 190b is higher than the surface pressure indicated by detector 190a. It is also observed that the surface pressure of the monomolecular layer in compartment 110b is dependent upon the volume of liquid that is introduced into compartment 110a through conduit 130 per unit time. The more liquid that is introduced into compartment 110a per unit time, the higher the velocity of the top surface layer of the liquid and the higher is the surface pressure of the compressed monomolecular layer in compartment 110b.

For example, a solution of the amphiphilic molecule, 22-tricosenoic acid, was spread in the first compartment of a tank having three compartments where the difference between the water levels in each two adjacent compartments was approximately 0.3 inch and where the apperture slopes was 30 degrees. When the flow rate of water introduced into the first compartment was 0.6 liter per minute, the monomolecular layer in the third compartment was compressed to a surface pressure of 27 $mNm^{-1}$. When the same experiment was conducted with a flow rate of 1.4 liter per minute, the monomolecular layer was compressed to a surface pressure of 44 $mNm^{-1}$. Thus it is an advantageous feature of the device of the present invention that the surface pressure of the monomolecular layer is easily controllable. In addition, the continuous introduction of clean water into the tank eliminates the need for frequent cleaning.

While the above description covers a tank having two compartments and one sloping barrier wall cut-out, more than two compartments and one sloping barrier wall cut-out is also within the scope of the present invention.

In a third embodiment of the present invention, and with reference to FIGS. 3a,b, there is shown an alternative construction of a tank in which the movement of the top surface layer of the liquid from one compartment to an adjacent compartment is caused by liquid level differences between each of two adjacent compartments, and the fact that a continuous laminar liquid flow is maintained. Tank 200 is divided by barrier walls 210 and 220 (with apertures, troughs, or cut-outs 210a and 220a) into three compartments 200a,b,c. The tank is filled with a liquid, such as water, such that the level of the liquid surface in compartment 200a is higher than the level of the liquid surface in compartment 200b and the level of the liquid surface in compartment 200b is higher than the level of the liquid surface in compartment 200c. A source of liquid is connected to compartment 200a through a conduit 230 and the rate of liquid flow through the conduit 230 controlled by valve 230a. A drainage conduit 240 connects compartment 200c to an open reservoir 250 that is filled with liquid to its capacity. The rim 250a of the reservoir 250, and the water level in compartment 200c, are at the same level. A bypass conduit 260 with a valve 260a connects compartments 200a and 200b, and a bypass conduit 270 with a valve 270a connects compartments 200b and 200c.

In this third embodiment of the present invention, the velocity of the top surface layer of the liquid moving from compartment 200a to compartment 200b through apperture 210a is dependent not only upon the quantity of liquid that is introduced into compartment 200a through conduit 230 per unit time, but also on the leakage through bypass conduit 260 that valve 260a allows. Similarly, the velocity of the top surface layer of the water from compartment 200b to compartment 200c through apperture 220a is dependent upon the leakage through bypass conduit 270 that valve 270a allows. Since the difference between the surface pressures of the monomolecular layer in two adjacent compartments is dependent upon the velocity of the top surface layer between said two compartment, it is an advantageous feature of this construction that it permits the surface pressure of the monomolecular layer in the last compartment as well as the control of the differences between the surface pressures of the monomolecular layer in each two adjacent compartments.

Although the third embodiment discussed above provides an excellent continuous system, it has been found that some breakdown in the monomolecular layer in compartment 200c is seen. The source of this problem was that the velocity of the liquid is lower at the corners of the chute 220a thereby creating some turbulence in the liquid. The turbulence in turn squeezes the compressed monomolecular layer causing it to break down, especially at higher surface pressures where the film is a solid.

To avoid the problem noted above, and with reference to FIGS. 4a,b, a fourth embodiment of the apparatus and method of the present invention includes static mechanical means comprising a continuous chute within the last compartment, and preferably further comprising conduits which connect a circulation pump to the tank thereby circulating the liquid in the tank to cause laminar flow of the liquid surface. In a preferred construction, a pump 300 is supported outside the lower portion of the tank 310 and connected by conduits 320b,c to compartment 310a which is designed as a continuous chute around compartment 310b. It is in compartment 310b that the compressed monomolecular layer films are deposited onto a substrate. The water flows in the direction indicated by arrows "a", i.e., the pump 300 pulls the transport liquid through conduit 320a and out of compartment 310b, and pushes the transport liquid through conduits 320b,c and into the compartment 310a which is separated from compartment 310b by continuous chute 310d. In the particular embodiment illustrated, the drainage opening 320d is in the bottom of the (n)th compartment of a tank having a series of n compartments. In the embodiment illustrated, the (n-2)th compartment 310c receives the monomolecular layer solution. The flow between this n-2nd and n-1st compartment is maintained by one of the previously described methods.

It should be appreciated that more than three compartments are contemplated as being within the scope of the invention. For example, another version of the fourth embodiment of the present invention uses three compartments or surface regions before the film is finally compressed in the compartment having the ring shaped chute. Preferably, the barrier wall separating compartments 310a and 310c has an aperture as discussed above with respect to barrier wall 20 and uses the embodiment of FIG. 1 to transport and compress the film. The flow rate into compartment 310b, and thus the surface pressure there, can be regulated by regulating the pump output. As a result of this construction, there is maximum material transport at the fastest possible speed, there is uniform velocity distribution (that is, no edges where the surface of velocity drops to zero), and there is the least chance for turbulence at the water surface. Variations of this embodiment are numerous. For example, the number of conduits and the shape of their openings can be varied to achieve more accurate flow rate regulation. Moreover, any tank compartment can be divided into a number of regions wherein either different monomolecular layers of different molecules are deposited or where there are multiple coatings applied to a substrate, or mixtures of both.

It should further be appreciated that the present invention contemplates an apparatus and method also including means for controlling the temperature of the transport liquid, means for controlling the pH of the liquid, means for adding additives to any of the liquid compartments or regions, and the use of mixtures of molecules, both amphiphilic and others.

It should also be appreciated that it is not necessary that a tank divided into compartments by barrier walls be used. In its most basic embodiment, the present invention comprises a flow of liquid at the liquid surface, where at a first region of the flowing liquid surface, the monomolecular layer molecules are deposited, and at a second region of the flowing liquid surface, a substrate is put into contact with the monomolecular layer which had been compressed and simultaneously transported by the liquid flow from the first region to the second region.

With respect to another aspect of the present invention, FIG. 5 shows tank 400 filled with a liquid. The tank is a component of the system discussed above for producing monolayers and for depositing monolayers onto substrates. A source of clean liquid (not shown) is connected to tank 400 through a conduit 410, the flow rate of the clean liquid through conduit 410 being controlled by valve 410a. The tank is equipped with means for draining the tank and means for controlling the surface level of the liquid in the tank. An example for a simple draining and level control device is incorporated in FIG. 5. A drainage conduit 420 connects tank 400 to an open reservoir 420a that is filled with liquid to its capacity. The rim 420b of the reservoir 420a, and the water level in tank 400, are horizontally level. Other draining and level control devices are also within the scope of this invention. For example, the surface level of the liquid in the tank can be controlled by a level sensing mechanism and a controlled output pump, or it can be controlled in part by the height and position of the drainage conduit, or it can be controlled in part by a low point in the rim of the tank.

An inflow of clean water is continuously introduced into tank 400 through conduit 410. Since the level of the water surface in the tank remains constant by the virtue of the open reservoir 420a, water is continuously drained out of the tank, via conduit 420 at the same rate that clean water is replenished into the tank via conduit 410. This construction of the tank permits a continuous replenishing and draining of the water in the tank so that the water in the tank is continuously being replaced with clean water at the same time that the tank is being used for producing monolayers and for depositing monolayers onto substrates. Since the water in the tank is continuously being replaced with clean water, the cumulative process of contaminating the water in the tank is substantially eliminated. The level of contamination of the liquid of the tank is reduced and the level as well as the type of contamination of said liquid does not vary significantly with time. It is thus possible to produce monolayers of higher quality and more consistency and to deposit the higher quality and more consistent monolayers onto substrates. This continuous replacement of water in the tank with clean water also reduces the need to idle the apparatus periodically in order to dump the water from the tank and to refill said tank with clean water.

It should be appreciated that if the design of the liquid inlet and the liquid outlet to the tank is adequate, the continuous movement of liquid in the tank, as a result of the continuous and simultaneous replenishing and draining of the tank, does not have a negative impact on the quality of the monolayers that are produced in the tank and are deposited onto substrates.

It should also be appreciated and emphasized that the present invention is broad in scope and that variations will occur to those of skill in the art, and that such variations are within the scope of the present invention.

I claim:

1. A system for producing monomolecular layers of amphiphilic molecules and for depositing the formed layers onto substrates, the system including:
   a tank for holding a liquid;
   means for depositing the amphiphilic molecules onto the surface of the liquid;
   means for continuously introducing clean liquid into the tank;
   means for continuously draining the liquid from the tank; and
   means for controlling the surface level of the liquid in the tank.

2. A system according to claim 1 wherein the surface level control means includes an open reservoir having a rim and a conduit, the conduit connecting the open reservoir to the tank, wherein the open reservoir is filled with liquid to its capacity and wherein the rim of the reservoir and the surface of the liquid in the tank are horizontally level.

3. A system according to claim 1 wherein the surface level control means includes a level sensing means reactive to the liquid level in the tank and a controlled output pump reactive to the level sensing means.

4. A system according to claim 1 wherein the draining means includes a conduit connected to the tank, and wherein the surface level of the liquid in the tank is controlled by the height and position of the drainage conduit.

5. A system according to claim 1 wherein at least a portion of the tank rim can be lowered to thereby control of the surface level of the liquid in the tank.

6. A method for improving the quality of monomolecular layers of amphiphilic molecules deposited onto substrates, the method including:
   continuously flowing uncontaminated liquid into a tank;
   continuously spreading a solution of amphiphilic molecules onto the surface of the liquid in the tank;
   continuously forming monomolecular layers on the surface of the liquid in the tank;
   continuously introducing substrates into the tank after monomolecular layers are formed; and
   regulating the flow and drain rate so that the liquid surface level in the tank is maintained constant.

* * * * *